US006817789B2

United States Patent
Maruhashi et al.

(10) Patent No.: US 6,817,789 B2
(45) Date of Patent: Nov. 16, 2004

(54) PHOTOSENSITIVE MATERIAL PROCESSING APPARATUS AND PHOTOSENSITIVE MATERIAL

(75) Inventors: Atsushi Maruhashi, Kanagawa (JP); Futoshi Yoshida, Kanagawa (JP); Kanenori Ochiai, Kanagawa (JP); Takayuki Iida, Kanagawa (JP); Yoshio Ozawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/359,658

(22) Filed: Feb. 7, 2003

(65) Prior Publication Data

US 2003/0152382 A1 Aug. 14, 2003

(30) Foreign Application Priority Data

Feb. 14, 2002 (JP) ...................................... 2002-037195

(51) Int. Cl.⁷ .............................................. G03D 13/00
(52) U.S. Cl. ....................... 396/568; 396/570; 396/612; 355/27
(58) Field of Search ............................... 396/567–570, 396/612; 355/27, 77; 399/45, 75, 82, 83

(56) References Cited

U.S. PATENT DOCUMENTS

| | | | | |
|---|---|---|---|---|
| 5,168,301 A | * | 12/1992 | Akisada et al. | ............... 355/27 |
| 5,235,369 A | * | 8/1993 | Nakamura et al. | .......... 396/569 |
| 5,669,031 A | * | 9/1997 | Ishikawa et al. | ............ 396/569 |
| 5,675,913 A | * | 10/1997 | Matsuda et al. | ............... 34/526 |
| 5,903,794 A | * | 5/1999 | Sheley et al. | ............... 396/612 |
| 5,980,126 A | * | 11/1999 | Yamamoto et al. | ......... 396/571 |
| 6,222,607 B1 | * | 4/2001 | Szajewski et al. | ............ 355/27 |

* cited by examiner

Primary Examiner—D. Rutledge
(74) Attorney, Agent, or Firm—Sughrue Mion, PLLC

(57) ABSTRACT

A photosensitive material processing apparatus includes a printer section for recording an image on photographic paper by exposure. There is a processor section for photographic development of the photographic paper. A drier section dries the photographic paper. A type bar code reader reads and inputs type information of a type of the photographic paper. A condition table memory is used to generate information of a transporting speed of the photographic paper and other processing conditions according to the type information being input, so as to control at least one of the printer section, the processor section and the drier section.

31 Claims, 7 Drawing Sheets

FIG. 3

| TYPES | | A | B | C |
|---|---|---|---|---|
| PRINTER SECTION | DRAWING SPEED | Vpm1 | Vpm2 | Vpm3 |
| | INTERVAL OF CUTTING | P1 | P2 | P3 |
| | EXISTENCE OF BACK PRINTING | YES | YES | NO |
| | EXPOSING SPEED | Ve1 | Ve2 | Ve3 |
| | SORTING SPEED | Vf1 | Vf2 | Vf3 |
| | TRANSPORTING SPEED | Vr1 | Vr2 | Vr3 |
| PROCESSOR SECTION | TRANSPORTING SPEED | Vp1 | Vp2 | Vp3 |
| | LIQUID TEMPERATURE | Tp1 | Tp2 | Tp3 |
| | REPLENISHER FLOW RATE | Qp1 | Qp2 | Qp3 |
| DRIER SECTION | TRANSPORTING SPEED | Vd1 | Vd2 | Vd3 |
| | DRYING TEMPERATURE | Td1 | Td2 | Td3 |
| | AIR FLOW RATE | Qd1 | Qd2 | Qd3 |
| STACKER SECTION | TRANSPORTING SPEED | Vs1 | Vs2 | Vs3 |
| | REALIGNING SPEED | Vm1 | Vm2 | Vm3 |
| | PLATE MOVING SPEED | Vb1 | Vb2 | Vb3 |

FIG. 4

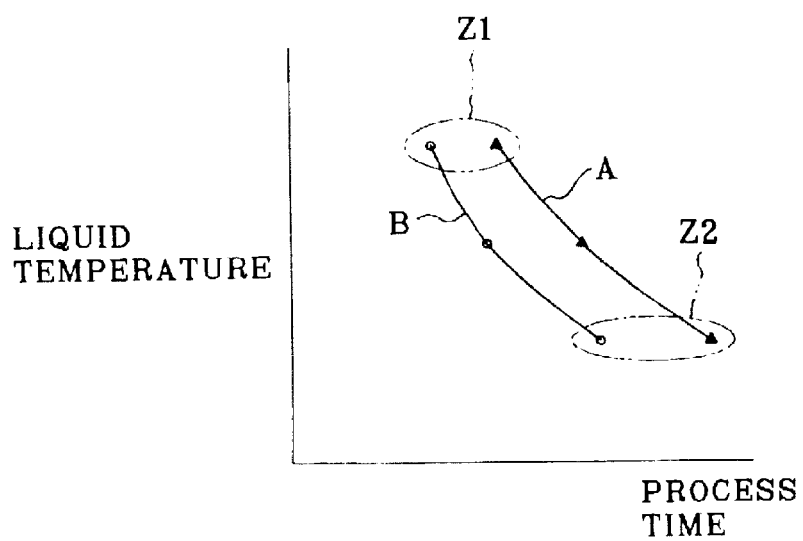

PHOTOSENSITIVE MATERIAL PROCESSING APPARATUS AND PHOTOSENSITIVE MATERIAL

BACKGROUND OF THE INVENTION

1. Field of the Invention

The present invention relates to a photosensitive material processing apparatus and photosensitive material. More particularly, the present invention relates to a photosensitive material processing apparatus in which a processing condition can be changed easily according to changes in the type of the photosensitive material in use, and photosensitive material.

2. Description Related to the Prior Art

A photosensitive material processing apparatus is used in a photo laboratory. An example of the photosensitive material processing apparatus is a printer/processor, which includes a printer section, a processor section, a drier section and a stacker section. The printer section prints an image to photographic paper as photosensitive material by exposure. The processor section develops the photographic paper being exposed. The stacker section is added if desired. In general, the processor section includes a transporting rollers and plural processing baths. The transporting rollers transport the photographic paper being exposed. The processing baths contain various kinds of processing liquid, which are for processing, bleaching/fixing, rinsing and stabilizing. The transporting rollers transport the photographic paper to the processing baths, to effect processing by passage in the processing liquid of those kinds one after another. For the photosensitive material processing apparatus of this structure, the developing liquid is predetermined as a combination including the photographic paper, as the developing liquid is suitable for the photographic paper. A process temperature and process time for the photographic paper in the developing bath are included in processing conditions predetermined according to the process of the developing liquid.

There are different photographic developing processes for various factors of the photographic paper, such as a type, manufacturer and the like of the photographic paper. To optimize the quality of images on the photographic paper for each one of the different types of the photographic paper, the processing conditions for the photosensitive material processing apparatus must be changed or altered. Such changes are associated with changes in the type of the photographic paper, and are input by manual operation to determine the processing conditions of the relevant sections. Thus, setting of the processing conditions requires laborious operation. If the processing conditions are erroneously set, no prints with high quality can be produced. There occurs waste of the photographic paper.

SUMMARY OF THE INVENTION

In view of the foregoing problems, an object of the present invention is to provide a photosensitive material processing apparatus and photosensitive material. More particularly, the present invention relates to a photosensitive material processing apparatus in which a processing condition can be changed easily according to changes in the type of the photosensitive material in use, and photosensitive material.

In order to achieve the above and other objects and advantages of this invention, a photosensitive material processing apparatus includes a printer section for recording an image on photosensitive material by exposure. There is a processor section for photographic development of the photosensitive material being exposed. A drier section dries the photosensitive material being developed. A type discerning unit discerns type information of a type of the photosensitive material. A condition information generator generates information of a processing condition according to the type information being discerned, so as to control at least one of the printer section, the processor section and the drier section.

The condition information generator includes a condition table memory for storing information of the processing condition predetermined for each of plural types of the photosensitive material. One of the plural types is selected according to the type information being discerned.

The processing condition for the printer section includes at least one of existence or lack of back printing to the photosensitive material, an exposing speed to the photosensitive material, a transporting speed of the photosensitive material, and a sorting speed of the photosensitive material to any one of plural transporting paths.

The photosensitive material is a photosensitive sheet. Furthermore, a roll loading chamber is loaded with a photosensitive material roll of long photosensitive material. A cutter cuts the long photosensitive material unwound from the photosensitive material roll, to obtain the photosensitive sheet, the printer processor being supplied with the photosensitive sheet. The processing condition includes at least one of a drawing speed of the long photosensitive material from the photosensitive material roll, and a cutting interval adapted to obtaining the photosensitive sheet from the long photosensitive material by cutting.

The processing condition of the processor section includes at least one of a transporting speed of the photosensitive material, liquid temperature of developing liquid for the photosensitive material, and a replenisher flow rate for the developing liquid.

The processing condition of the drier section includes at least one of a transporting speed of the photosensitive material, a drying temperature of drying air for the photosensitive material, and an air flow rate of the drying air.

Furthermore, a transporting mechanism transports the photosensitive material in the printer section, the processor section and the drier section serially. The processing condition includes a transporting speed at which the transporting mechanism transports the photosensitive material.

Furthermore, a controller checks whether coincidence occurs between the type information being discerned and the type information of the plural types being stored, and if the coincidence does not occur, disables operation with the photosensitive material, or generating an alarm signal.

The photosensitive material is supplied while contained in a magazine, there is an information region formed in the photosensitive material or the magazine for recording of the type information. The type discerning unit is an information reader for reading the type information of the photosensitive material from the information region.

The magazine includes a type ID chip, secured to the information region, for storing the type information.

The photosensitive material is supplied in a form of a photosensitive material roll, and the photosensitive material roll includes a spool for winding of the photosensitive material in a state with a front end of the photosensitive material positioned outside, and with a back surface of the photosensitive material directed outwards. A leader sheet is secured to the front end, for being advanced forwards in unwinding the photosensitive material. An information region is formed in at least one of the front end, the back surface, the leader sheet and the spool, and has the type information of the type of the photosensitive material.

The type information includes a type indicia, a type number, or a type code.

Furthermore, a type ID chip is secured to the information region, for storing the type information.

Information of the processing condition stored in the condition table memory is predetermined further for each of first and second modes, the first mode is preset with priority of high speed over economized energy, and the second mode is preset with priority of economized energy over high speed. Furthermore, an externally operable mode selector selectively determines the first and second modes.

Furthermore, a photosensitive material sensor checks exiting of a preceding photosensitive material from the processor section. After exiting of the preceding photosensitive material from the processor section, the transporting mechanism operates at the transporting speed determined newly.

Furthermore, a controller detects whether the photosensitive material has been changed over before reading of the type information in the type discerning unit, and if the photosensitive material has been changed over, allows setting of the transporting mechanism at the transporting speed determined newly.

Furthermore, a display panel indicates information related to the type or the transporting speed.

The photosensitive material comprises a photosensitive sheet. Furthermore, a sheet supply section supplies the printer section with the photosensitive sheet. There is a memory, including a first memory area for storing tracking information written thereto in synchronism with operation of the sheet supply section. A second memory area stores the tracking information written thereto in synchronism with transport of the photosensitive sheet to the printer section according to shifting from the first memory area. A third memory area stores the tracking information written thereto in synchronism with transport of the photosensitive sheet to the processor section according to shifting from the second memory area. A fourth memory area stores the tracking information written thereto in synchronism with transport of the photosensitive sheet to the drier section according to shifting from the third memory area, the first to fourth memory areas being adapted to tracking a position of the photosensitive sheet being transported.

The sheet supply section includes a roll loading chamber for being loaded with a photosensitive material roll of long photosensitive material. A cutter cuts the long photosensitive material unwound from the photosensitive material roll, to obtain the photosensitive sheet.

Each of the first to fourth memory areas is constituted by at least one register.

The tracking information represents at least one of the type, a width and a length of the photosensitive sheet. Furthermore, a controller produces the tracking information individually in association with the photosensitive sheet.

According to another aspect of the invention, a photosensitive material roll constituted by winding of photosensitive material includes a spool for winding of the photosensitive material in a state with a front end of the photosensitive material positioned outside, and with a back surface of the photosensitive material directed outwards. A leader sheet is secured to the front end, for being advanced forwards in unwinding the photosensitive material. An information region is formed in at least one of the front end, the back surface, the leader sheet and the spool, and has type information of the photosensitive material.

BRIEF DESCRIPTION OF THE DRAWINGS

The above objects and advantages of the present invention will become more apparent from the following detailed description when read in connection with the accompanying drawings, in which:

FIG. 3 is a table illustrating condition table data for each of types of photographic paper;

FIG. 4 is a graph illustrating a relationship between a process temperature and process time;

DETAILED DESCRIPTION OF THE PREFERRED EMBODIMENT(S) OF THE PRESENT INVENTION

Figure 1B:
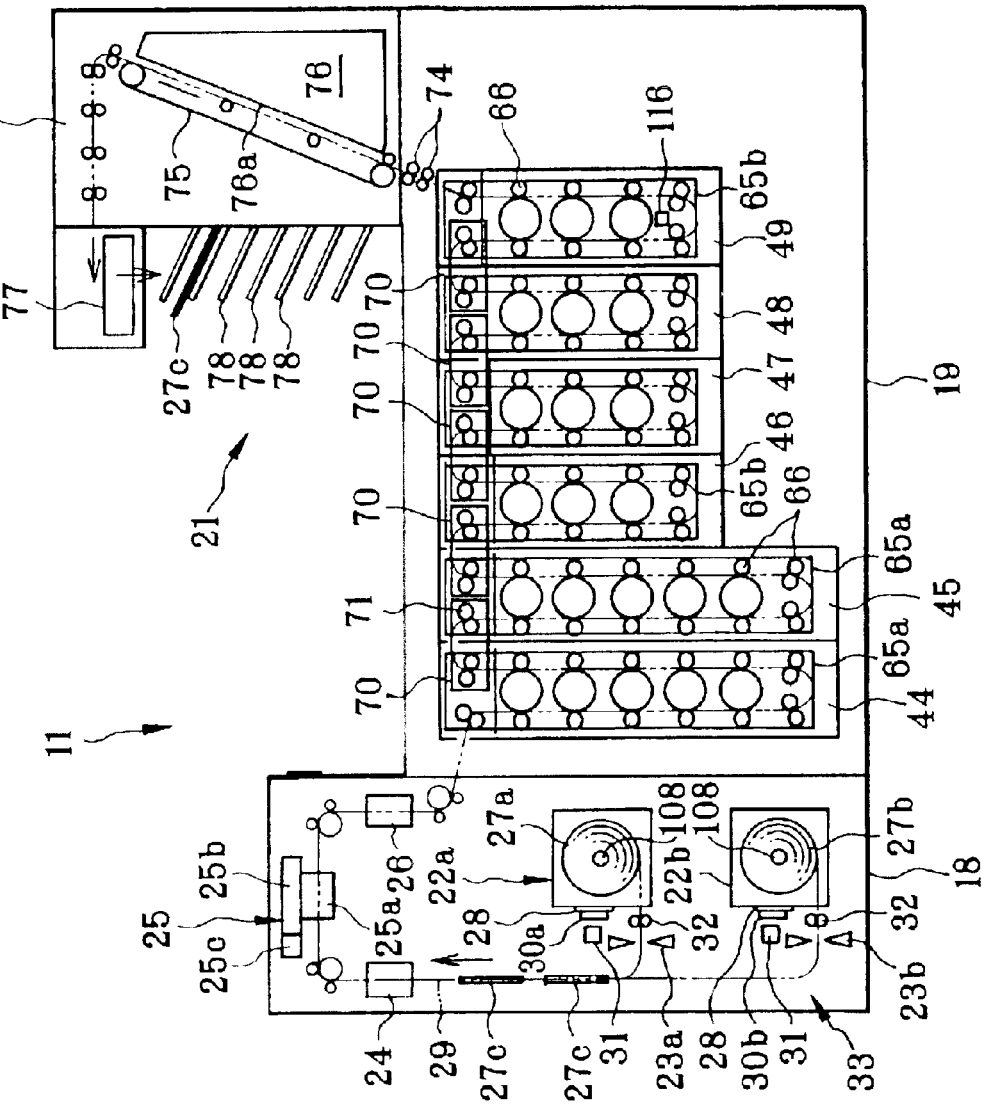
FIG. 1B is an explanatory view in front elevation, illustrating an output equipment included in the photo laboratory system.
Figure 1A:
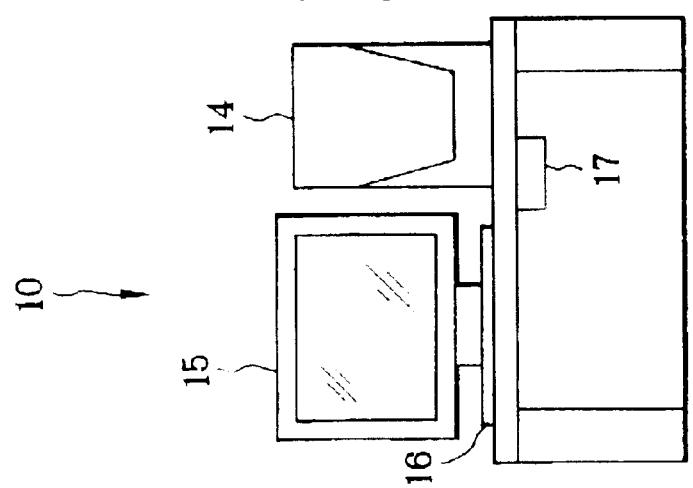
FIG. 1A is a front elevation illustrating an input equipment included in a photo laboratory system.

A photo laboratory system is a combination of an input equipment 10 and an output equipment 11. In FIG. 1A, the input equipment 10 for a digital image is illustrated. In FIG. 1B, the output equipment 11 as photosensitive material processing apparatus is illustrated. In FIG. 1A, the input equipment 10 includes an image reader 14 or scanner, a monitor display panel 15, an operation panel 16 and an image data input unit 17. The image reader 14 reads an image from a photo film as digital image data, which is stored in its memory. The digital image data is displayed in the monitor display panel 15. An operator observes an image in the monitor display panel 15 if required, and operates the operation panel 16 having a keyboard, mouse or the like, for revising and editing the image. The image data input unit 17 retrieves image data and writes the same to a memory in the image reader 14, the image data being obtained by photographing in a video camera or digital camera, or obtained by means of a certain network, the Internet, or the like.

The output equipment 11 is constituted by a printer section 18, a processor section 19, a drier section 20, and a stacker section 21. The printer section 18 is loaded with roll magazines 22a and 22b, and includes cutters 23a and 23b, a back printing device 24, an image forming device 25, and a sorting device 26.

A roll of long photographic paper 27a is contained in the roll magazine 22a. A roll of long photographic paper 27b is contained in the roll magazine 22b, and has a width different from the photographic paper 27a, or has a surface type different from that of the photographic paper 27a. The photographic paper 27a and 27b is photosensitive material. An information region 28 is formed as a portion of a surface of the roll magazines 22a and 22b. Bar code sheets 30a and 30b are attached to the roll magazines 22a and 22b in the information region 28. The bar code sheets 30a and 30b as type code or type information are attached to a respective case or magazine for the photographic paper 27a and 27b, and have a printed bar code for representing the type of the photographic paper 27a and 27b. A bar code reader 31 as an information reader in a type discerning unit is disposed inside the printer section 18, is opposed to the information region 28, and reads the bar code from the bar code sheets 30a and 30b.

A transporting roller 32 is disposed at each passage mouth of the roll magazines 22a and 22b for advancing the photographic paper 27a or 27b. The transporting roller 32 is controlled according to image outputting size information received from the input equipment 10, and operates at an advancing amount or cutting length determined by the size information. The photographic paper 27a being advanced is cut by one of the cutters 23a and 23b at a predetermined length, so a photographic paper sheet 27c as photosensitive sheet is obtained, and is moved past the back printing device 24.

The back printing device 24 prints information to a back surface of the photographic paper sheet 27c with an ink ribbon by means of outputs of dot impact. The information has a form of indicia, signs, letters, numbers or images, and includes an ordering number, an image number or the like. The photographic paper sheet 27c after the back printing is transported to the image forming device 25. Note that there is a transporting path 29 through which the photographic paper sheet 27c is transported. Also, a shifting mechanism (not shown) is incorporated in the back printing device 24. The shifting mechanism changes a back printing position according to an operator's intention, so the information can be printed to any suitable position, which may be a center of the back surface. In using a particular type of the photographic paper sheet 27c which is transparent and specialized for a professional use, the back printing device 24 is kept from operating and does not print to the photographic paper sheet 27c. Otherwise, the information is printed into a peripheral margin of the image not to influence the image quality. To this end, the shifting mechanism is used to change the back printing position.

The image forming device 25 includes a transporting mechanism 25a, an exposure printhead 25b and an image data processor 25c. The transporting mechanism 25a transports the photographic paper sheet 27c in a sub scan direction. The exposure printhead 25b is controlled in synchronism with transport of the transporting mechanism 25a, and applies laser light to the photographic paper sheet 27c for line-shaped exposure in a main scan direction. The transporting mechanism 25a includes a pair of transporting rollers, between which an exposure position is disposed, and which transport the photographic paper sheet 27c.

The image data processor 25c is supplied with image data by the input equipment 10 or other devices. The image data processor 25c subjects the image data to a prescribed data processing, for example calibration processing by means of a calibration table. According to the processed image data, a light beam is modulated by a modulator in the exposure printhead 25b, and is applied to the photographic paper sheet 27c for an exposure. Therefore, an image is recorded to the photographic paper sheet 27c as a latent image according to the image data. A plurality of exposed photographic paper sheets 27c are sorted into two trains, and are transported to the processor section 19 in an orientation with its emulsion surface directed up and with its back surface directed down.

The processor section 19 is constituted by a developing bath 44, a bleaching/fixing bath 45, a first rinsing bath 46, a second rinsing bath 47, a third rinsing bath 48, and a fourth rinsing bath 49.

Figure 2:
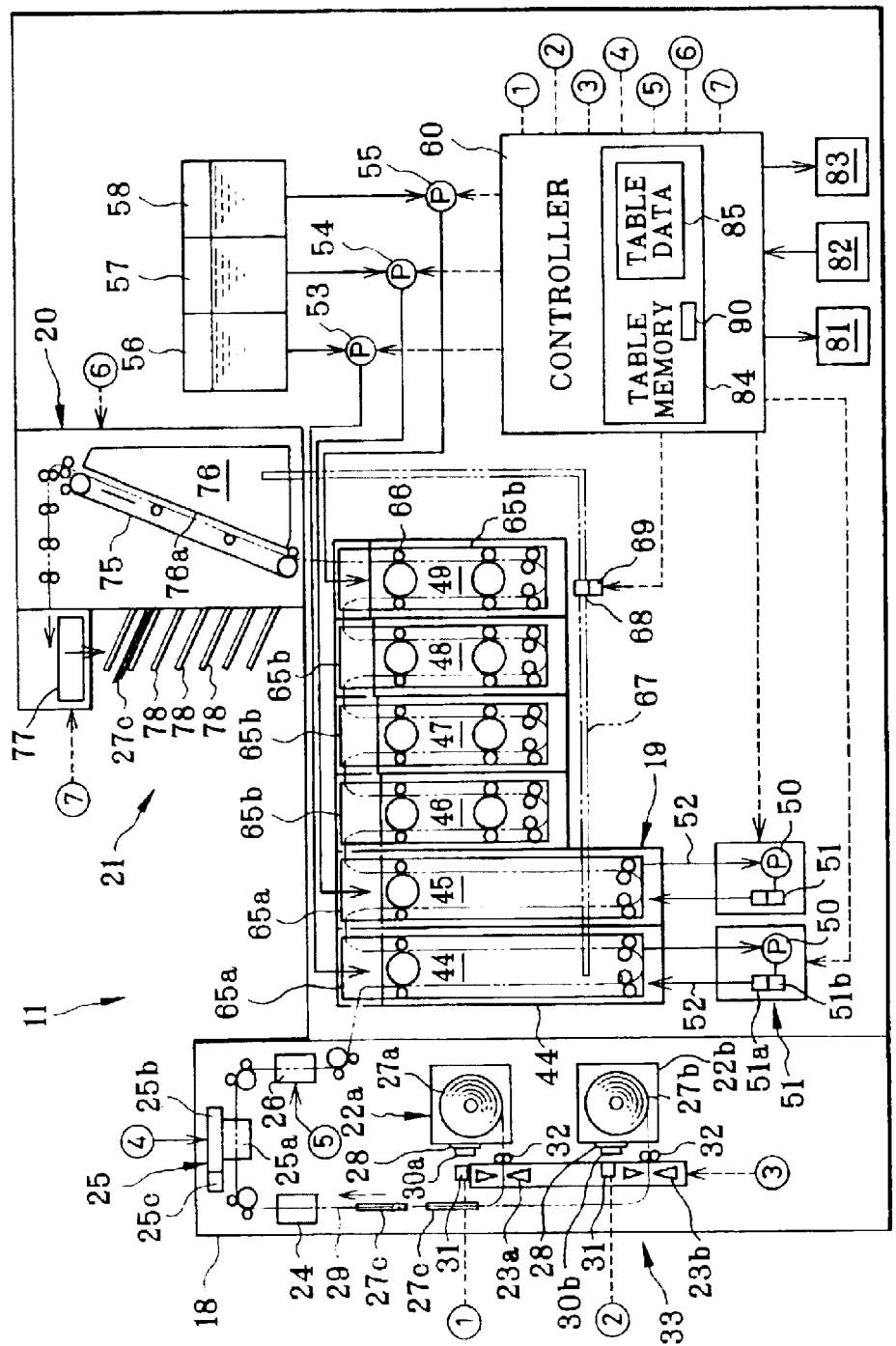
FIG. 2 is an explanatory view in front elevation, illustrating the same as FIG. 1B but with its control system depicted in detail.

In FIG. 2, a circulation pump 50 and a temperature adjustor 51 are associated with each of the developing bath 44 and the bleaching/fixing bath 45. The circulation pump 50 circulates the liquid in the developing bath 44 and the bleaching/fixing bath 45 to agitate the liquid. The temperature adjustor 51 includes a heater 51a and a radiator 51b, which are disposed in a circulation path 52 through which the circulation pump 50 effects the circulation, so the temperature adjustor 51 may adjust the liquid temperature. A controller 60 controls the temperature adjustor 51.

A replenisher tank 56 is connected with the developing bath 44. A supply pump 53 between the developing bath 44 and the replenisher tank 56 causes replenisher liquid to flow into the developing liquid in the developing bath 44. Similarly, a replenisher tank 57 is connected with the bleaching/fixing bath 45. A supply pump 54 between the bleaching/fixing bath 45 and the replenisher tank 57 causes replenisher liquid to flow into the bleaching/fixing bath 45. The supply pumps 53 and 54 are regulating pumps of which a rate of a downstream flow is kept constant. To change a flow rate of the replenisher, actuating time of the supply pumps 53 and 54 per unit time is changed by the controller 60.

In FIG. 2, a water tank 58 stores water for rinsing. A supply pump 55 supplies the fourth rinsing bath 49 with the water from the water tank 58. An added portion of the rinsing water overflows in a cascade manner from the fourth rinsing bath 49 to the third rinsing bath 48, from the third rinsing bath 48 to the second rinsing bath 47, and from the second rinsing bath 47 to the first rinsing bath 46, in the direction reverse to the transport of the photographic paper sheet 27c. Thus, the rinsing baths 46–49 are replenished with the rinsing water.

A transporting rack 65a is disposed in each of the developing bath 44 and the bleaching/fixing bath 45, and transports the photographic paper sheet 27c. A transporting rack 65b is disposed in each of the rinsing baths 46–49, and transports the photographic paper sheet 27c. Transporting rollers 66 are included in each of the transporting racks 65a and 65b. A common drive shaft 67 is engaged with or connected with rotational shafts of the transporting racks 65a and 65b, to rotate the transporting rollers 66. A speed changing mechanism 68 is connected with the drive shaft 67. A motor 69 causes the speed changing mechanism 68 to rotate the drive shaft 67. The speed changing mechanism 68 and the motor 69 are controlled by the controller 60. The rotation of the drive shaft 67 is also transmitted to a mechanism in the drier section 20, and causes the photographic paper sheet 27c to move.

In FIG. 1, crossover racks 70 are disposed to bridge the baths 44–49. There are transporting rollers 71 in the crossover racks 70 for transferring the photographic paper sheet 27c to each downstream one of the baths 45–49. The crossover racks 70 are also connected with the drive shaft 67 illustrated in FIG. 2 to cause the transporting rollers 71 to rotate.

The drier section 20 is disposed above the fourth rinsing bath 49, and dries the photographic paper sheet 27c transported from the fourth rinsing bath 49. There are squeezing rollers 74, which squeeze the photographic paper sheet 27c to send the same to the drier section 20. A conveyor belt 75 and an air circulator 76 are incorporated in the drier section 20. The conveyor belt 75 has a mesh form, and extends in a direction of the transporting path. A slitted panel 76a is incorporated in the air circulator 76 as well as a heater, duct, and fan or blower. The air circulator 76 blows drying air from inside the slitted panel 76a toward the transporting path, and circulates the drying air through the duct. There is a fresh air intake port in the duct, for letting fresh air in the duct. There is a heater in the duct for heating circulated air up to a predetermined temperature. Drying air is exhausted through the slitted panel 76a to blow the photographic paper sheet 27c, to dry the photographic paper sheet 27c in a state pressed on the conveyor belt 75. For the drier section 20, the controller 60 is used to control various items which include the temperature and flow rate of the drying air, and a rate of intake of the fresh air.

The stacker section 21 is disposed beside the drier section 20, and stacks the photographic paper sheet 27c in a sorted manner as a unit of ordering after the drying operation. Sorting trays 78 are arranged in the stacker section 21, to support the sorted unit of the photographic paper sheet 27c. A circulating belt (not shown) is incorporated in the stacker section 21, and adapted to fixation of the sorting trays 78 arranged at a certain interval. Also, a realigning device 77 is incorporated in the stacker section 21. The realigning device 77 aligns the plural trains of the photographic paper sheets 27c, and treats the photographic paper sheets 27c in a single path. The controller 60 is also used to control and adjust the paper transporting speed in the stacker section 21, the realigning speed in the realigning device 77, and the moving speed of the sorting trays 78.

In FIG. 2, the controller 60 includes a display panel 81, an operation panel 82 as a mode selector, and an alarm device 83, and controls the relevant sections sequentially. According to the type of the photographic paper sheet 27c, the processing conditions of the printer section 18, the processor section 19, the drier section 20 and the stacker section 21 are changed, to optimize the setting in the processing in view of the specific type. A condition table memory 84 is incorporated in the controller 60 as condition information generator. A table data 85 as a processing condition is stored in the condition table memory 84, and includes condition data which represent predetermined processing conditions of the relevant sections in association with types of the photographic paper 27a and 27b. It is possible to rewrite, or add data to, the table data 85 in a suitable manner. If new photographic paper is supplied, then a processing condition is added according to the photographic paper.

In FIG. 3, an example of the table data 85 is illustrated. The conditions for the printer section 18, the processor section 19, the drier section 20 and the stacker section 21 are predetermined for each of the types A, B and C of the photographic paper 27. When the type A is set, the conditions for the sections 18–21 are read regarding the type A. A print is produced according to the setting of the sections 18–21 in the determined conditions.

The type A is a widely used type of the photographic paper 27. The type B has an emulsion layer with a smaller thickness than that of the type A, and is a rapid type because of shorter time in the processing. The type C is transparent, and is a type for a professional use. The type C of the photographic paper 27 is transparent, and has a support of plastic material, for example polyethylene terephthalate (PET). The weight of the type C is higher than the type A or B, so it is necessary to lower the speed of drawing for the purpose of sufficient precision by minimizing irregularity in the sheet length. As will be described more in detail, the drawing speed from the magazine is changed over to a lower level for the type C than the types A and B. There is no suitability of printing regarding a combination of a dot impact printer and polyethylene terephthalate sheets. Thus, other printers should be used, for example, an ink jet printer. Note that ink or other coloring substance used in such printers should have characteristics resistant to liquids in the photographic process. Also, the transparent feature may cause overlapped printing if an indicia or the like is back-printed. Thus, it is preferable to print an indicia or the like on a back surface of a margin of the photographic paper sheet 27c. Furthermore, it is possible in the type C to select a process without the back printing, because the frequency of using the type C is lower than the types A and B.

In FIG. 4, curves are illustrated for relationships between the liquid temperature and the process time in the developing bath 44 for the photographic paper 27 of the types A and B. As is read from the graph, the process time is shorter for the type B than for the type A in the condition of the same liquid temperature. Also, the process time is shortened when the liquid temperature is raised in the condition of each of the types of the photographic paper 27.

According to the above specifics, conditions are determined for the relevant sections. Among the conditions, the process time and the process temperature in the processor section 19 are important specifically, and determined initially before the remaining conditions for the printer section 18, the drier section 20 and the stacker section 21 are determined in view of efficiency in the operation. In FIG. 3, a table is illustrated to indicate the determined conditions.

For printing with the photographic paper 27a of the type A, at first a transporting speed Vp1 and a liquid temperature Tp1 of the photographic paper sheet 27c are determined for the processor section 19. Also, a replenisher flow rate Qp1 for supply to the baths 44–49 is determined under the conditions of Vp1 and Tp1 for the processor section 19. Furthermore, the conditions for the printer section 18 are determined for high efficiency according to the transporting speed Vp1 in the processor section 19, the conditions including a drawing speed Vpm1 of drawing of the photographic paper 27a from the magazine, a cutting interval P1 in the printer section 18, existence or lack of back printing, an exposing speed Ve1, a sorting speed Vf1, and a transporting speed Vr1 from the image forming device 25 toward the sorting device 26. Also, the conditions for the drier section 20 are determined for high efficiency according to the transporting speed Vp1 in the processor section 19, the conditions including a transporting speed Vd1, a drying temperature Td1, and an air flow rate Qd1. Similarly, the conditions for the stacker section 21 are determined, including a transporting speed Vs1 of the stacker section 21, a realigning speed Vm1 for aligning and joining the plural trains of the photographic paper sheets 27c, and a plate moving speed Vb1 of the sorting trays 78.

Similarly, the sections 18–21 in combination with the type B of the photographic paper 27 are conditioned. At first, the transporting speed Vp2, the liquid temperature Tp2, and the replenisher flow rate Qp2 are determined in relation to the processor section 19. Those values satisfy Vp2>Vp1, Tp2≦Tp1, and Qp2≧Qp1. According to those, the remaining conditions for the relevant sections are determined as illustrated in FIG. 3, including P2, Vpm2, existence of back printing, Vr2, Ve2, Vf2, Vd2, Td2, Qd2, Vs2, Vm2, and Vb2. Those values satisfy P2≦P1, Vpm2≧Vpm1, Vr2≧Vr1, Ve2≧Ve1, Vf2≧Vf1, Vd2>Vd1, Td2≦Td1, Qd2≦Qd1, Vs2>Vs1, Vm2≧Vm1, and Vb2≧Vb1.

Also, the sections 18–21 in combination with the type C of the photographic paper 27 are conditioned. At first, the transporting speed Vp3, the liquid temperature Tp3, and the replenisher flow rate Qp3 are determined in relation to the processor section 19. Those values satisfy Vp3<Vp1, Tp3≧Tp1, and Qp3≦Qp1. According to those, the remaining conditions for the relevant sections are determined, including P3, Vpm3, suppression of back printing, Vr3, Ve3, Vf3, Vd3, Td3, Qd3, Vs3, Vm3, and Vb3. Those values satisfy P3≧P1, Vpm3<Vpm1, Vr3<Vr1, Ve3≦Ve1, Vf3≦Vf1, Vd3<Vd1, Td3≧Td1, Qd3≦Qd1, Vs3<Vs1, Vm3≦Vm1, and Vb3≦Vb1. Note that the drawing speed Vpm3 is set specially low as described above, to minimize irregularity in the size of the photographic paper sheet 27c in its longitudinal direction. Also, the back printing is suppressed. It is to be noted that all of the above-described conditions are used for one common printing size. If there are plural prescribed printing sizes, the conditions are varied in consideration of the plural sizes.

Figure 5:
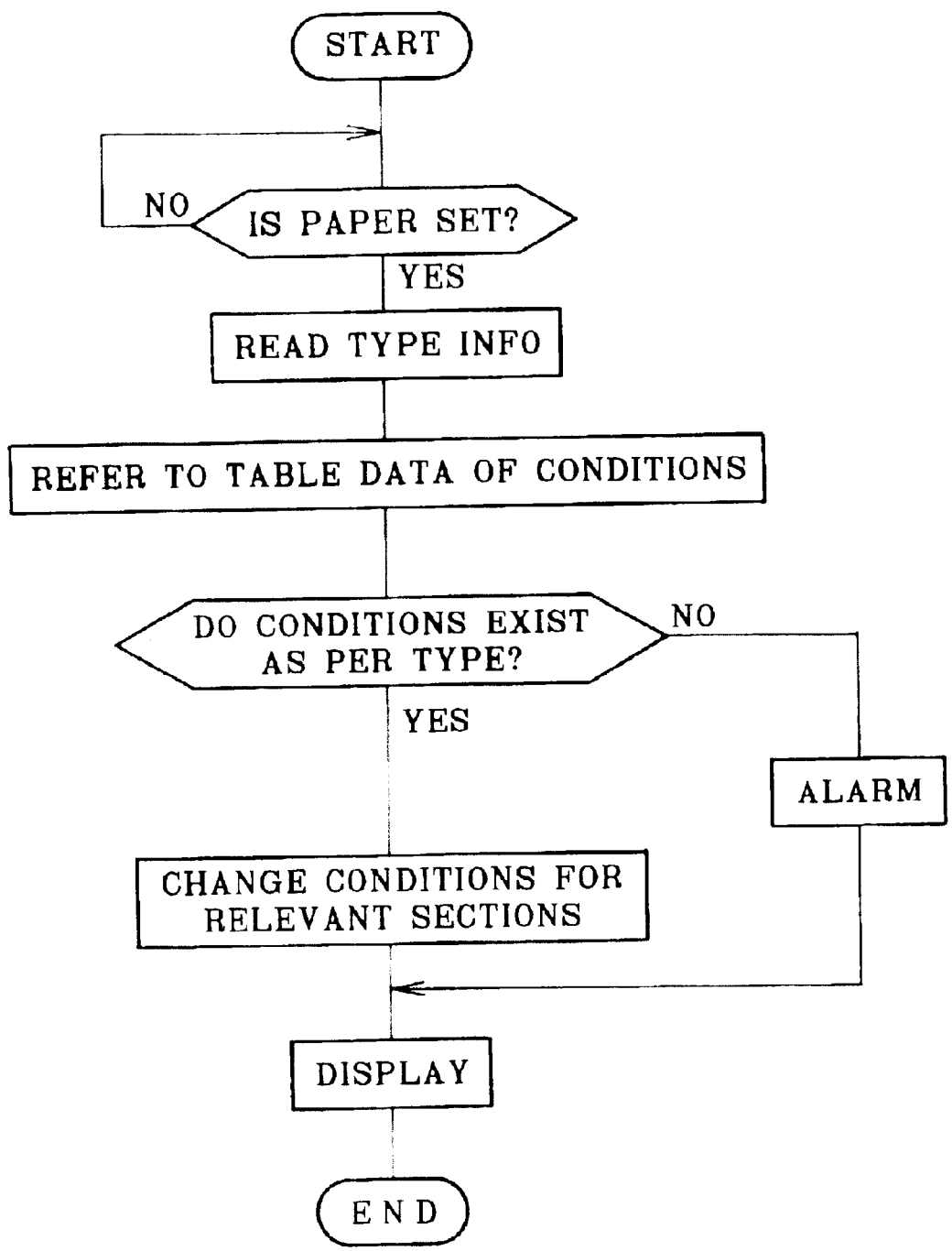
FIG. 5 is a flow chart illustrating operation of the embodiment.

The operation of the above construction is described with reference to FIG. 5. To produce a print in the output equipment 11 by use of the types A and B of the photographic paper, the roll of the photographic paper 27a of the type A contained in the roll magazine 22a is set in the printer section 18. The bar code representing information of the type A is read from the bar code sheet 30a of the roll magazine 22a. According to the type A, the controller 60 refers to the table data in the condition table memory 84, and reads out the conditions associated with the type A. Thus, the relevant sections are conditioned according to the obtained conditions.

When the magazine containing the photographic paper 27a or 27b of the type B or C is set in the printer section 18, type information of the type B or C is read from the bar code sheet. The controller 60 controls the various relevant sections according to the type B or C for printing. The display panel 81 is caused to indicate the type B or C in use, and an important part of those conditions.

If a type of the photographic paper 27 different from any of the registered types is detected, the controller 60 generates an alarm signal for impossibility of processing. The display panel 81 is caused to indicate information of an error or impossibility of processing. Also, the alarm device 83 is caused to generate an acoustic signal of alarm. Also, the controller 60 disables the printing. Even if a key, button or the like is operated for printing, there is no start of the printing. Therefore, the printing is disabled if a type different from the registered types of the photographic paper 27 is set. There is no occurrence of using unacceptable types or non-genuine types supplied by third parties without being recommended by a printer manufacturer. The quality of the printing can be prevented from being lower.

In the above embodiment, the conditions for the relevant sections are changed for changes between the plural types of the photographic paper 27. However, changes in the conditions according to the invention may be used for adjustment during the use of only a single type of the photographic paper 27. The conditions can be optimized by adjusting the process speed or process time, and the process temperature, according to table data prescribed for the purpose of optimization.

In FIG. 4, a relationship between the process time and the liquid temperature for the photographic paper 27 is illustrated. In a zone Z1, the liquid temperature is heightened, to shorten the process time of the photographic paper 27 which is unchanged. In a zone Z2, the liquid temperature is lowered in the color development. Although the process time is somewhat longer, it is possible to lower and economize energy in the color development because of the lower liquid temperature. So processing conditions for the zones Z1 and Z2 may be predetermined. It is possible to determine a rapid processing mode associated with the zone Z1 and an economized energy processing mode associated with the zone Z2, and to select a desired one of those.

Figure 8:
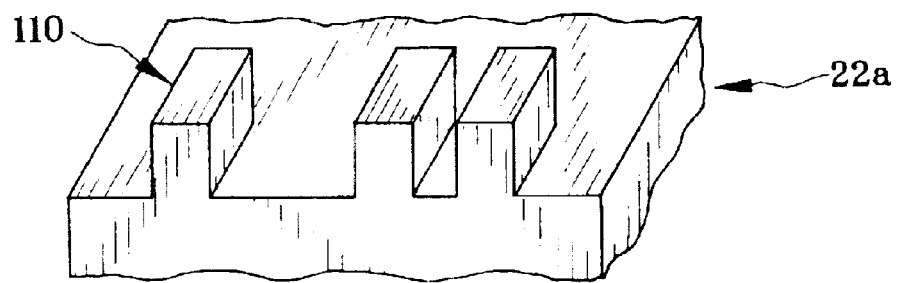
FIG. 8 is a perspective, partially cutaway, illustrating a paper type indicia formed on a roll magazine.
Figure 9:
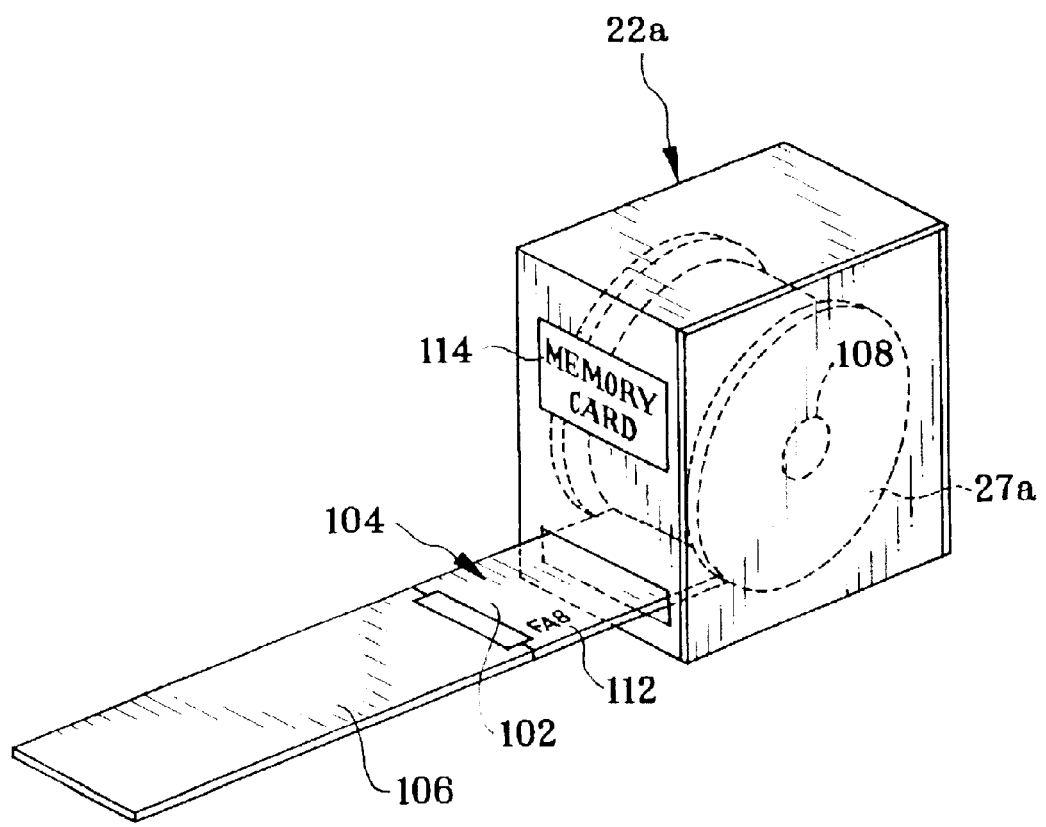
FIG. 9 is a perspective illustrating another preferred roll magazine having a memory card.

In the above embodiment, the bar code sheets 30a and 30b on the roll magazines 22a and 22b are read to discern the type of the photographic paper 27 automatically. However, other methods may be used for automatically discerning and inputting the type information. In FIG. 8, an example is illustrated. A paper type indicia 110 may be formed on a surface of the magazine, and may be constituted by a pattern of projections or recesses. The form or position of the paper type indicia 110 can be prescribed for each one of the types of the photographic paper 27a. Also, if plural magazines are used in association with respectively the plural types of the photographic paper 27a and 27b, then a memory card 114 with a paper type ID chip may be provided on each of the magazines. See FIG. 9. The memory card 114 can be accessed for reading according to a contact type or non-contact type of reading, so as to discern the type of the photographic paper 27a and 27b. The photographic paper 27a includes a front end 102, is provided with a leader sheet 106, and is wound about a spool 108. The memory card 114 may be attached to or incorporated in any one of the front end 102, the leader sheet 106 and the spool 108. Also, the type information may be printed on a back surface 104 of the front end 102 of the photographic paper 27a, or on the spool 108, in any one of forms of the paper type indicia 110, paper type number 112, the type bar code, letters, image or the like, that is readable by means of a suitable information reader. Also, the type information may not be input automatically. Instead, an operator may manually input the type information. To this end, he or she can operate a keyboard, mouse, panel, or other operation devices for determining the type information.

Note that, if any one of the front end 102, the back surface 104, the leader sheet 106 and the spool 108 of the photographic paper is provided with type information in a visible form, an optical reader such as an OCR is used as type discerning unit for reading the type information. This is specifically effective for the paper type number 112, letters, indicia and the like as type information. If the type information has a form of a bar code or the like, then a bar code reader of a suitable type can be used. Also, a magnetic recording layer may be formed on any of the above-mentioned four elements, and may store the type information. A magnetic reader may be used to read the type information. In using the memory card 114, card connecting terminals are used for the access of the controller 60 to the memory card 114 as an external memory for the purpose of reading the type information. For the paper type indicia 110 constituted by the patterned projections, it is possible to use an optical reader, a contact-type of sensor or the like.

In the above embodiment, the transporting speed, drying temperature and drying air flow rate are changed for the drier section 20 according to the type of the photographic paper 27. Furthermore, a flow rate of intake of fresh air may be changed for each one of the types of the photographic paper 27. In the above embodiment, a plurality of the processing conditions are changed. However, it is unnecessary to change all of the plural processing conditions. At least one of the processing conditions may be changed. It is possible to vary the conditioned setting with a higher degree of freedom if the number of the changeable conditions is higher.

In the above embodiment, the radiator 51b is used to lower the liquid temperature. However, the radiator 51b may be omitted. For this modified structure, the temperature is lowered by natural cooling, namely, leaving the liquid to stand with time. When the temperature comes down to a reference temperature determined previously, the use of the developing bath 44 or the bleaching/fixing bath 45 are restarted for processing. Furthermore, if there is a plan of using at least one different type of the photographic paper 27a, then information of the plural types is previously input before starting the operation. An order of treating the plural types of the photographic paper 27a may be determined according to an order from the lowest liquid temperature to the highest liquid temperature of the developing liquid. To this end, the management of the processes can be automated on the basis of the type information being input. Thus, the liquid temperature can be raised efficiently. Also, the process time can be short because there is no need of lowering the liquid temperature in the course of operation.

Another preferred embodiment is now described, in which the three types of photographic paper are consecutively processed. The output equipment 11 is used commonly, and operated consecutively for printing with the types A, B and C, in which the type A is a widely used type of the photographic paper 27, the type B has an emulsion layer with a smaller thickness than that of the type A, and is a rapid type, and the type C is transparent, and is a type for a professional use. The type C is observed by use of transmitted light because of transparency. There occurs no blur of colors in comparison with a light reflecting original. An image with high precision can be obtained. However, the emulsion layer is provided with a greater thickness. The process time for the type C is longer than that for the type A.

Figure 6:
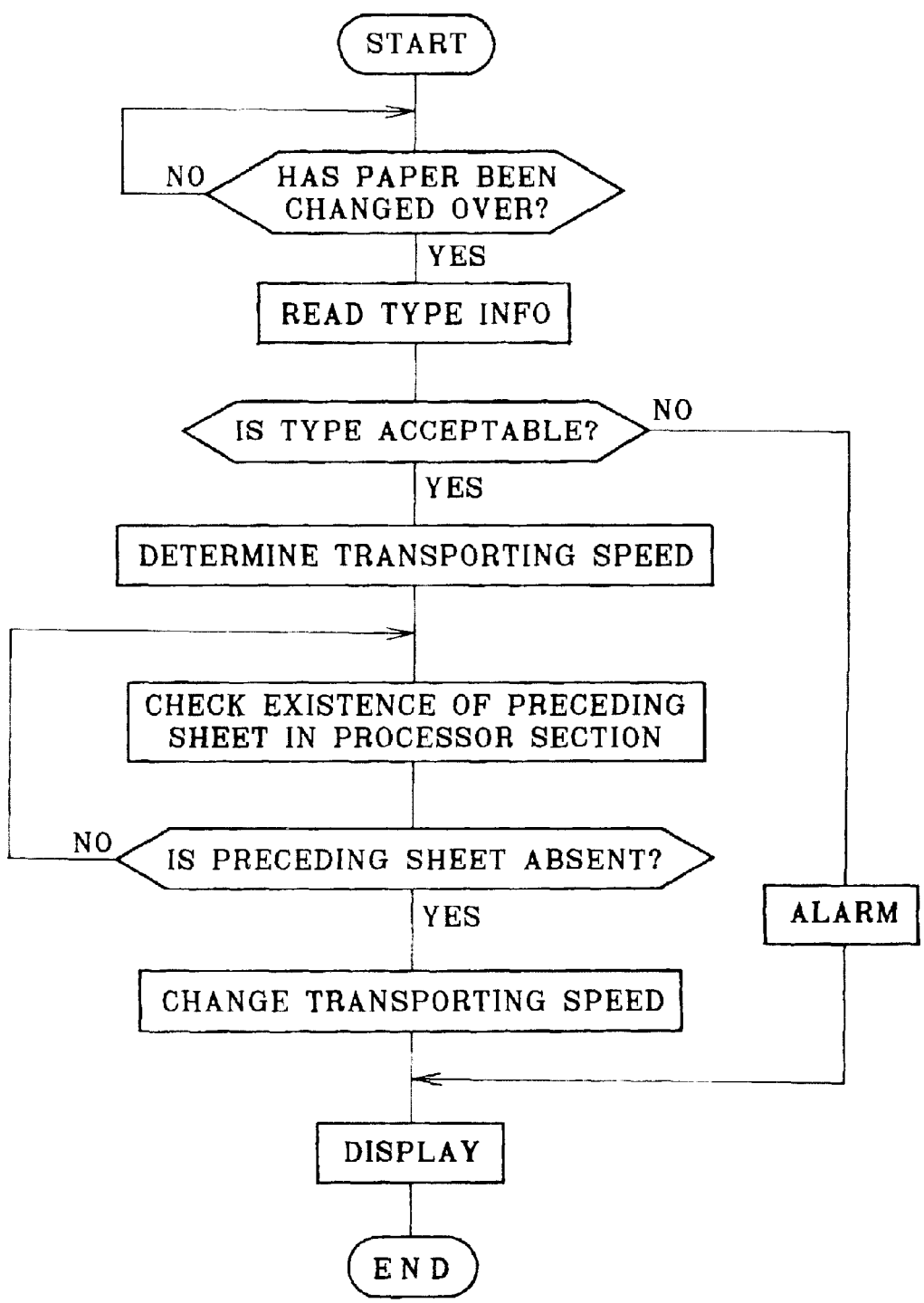
FIG. 6 is a flow chart illustrating operation of another preferred embodiment in which photographic papers of the plural types are treated consecutively.

It is necessary quickly to set the condition suitable for the photographic process if shortening is desired in changing over the process between the types A, B and C for which the process time is different. If the liquid temperature is changed, considerable time for the change is required. In the present embodiment, only the transporting speed is changed as illustrated in FIG. 6 for the purpose of shortening the time for changing over.

In the output equipment 11, the process times are well-balanced among the printer section 18, the processor section 19, the drier section 20 and the stacker section 21. However, the most important one of them is the photographic process time associated with the processor section 19. The performance or capability of the printer section 18, the drier section 20 and the stacker section 21 is determined according to the photographic process time, to result in sufficiently short process times.

In the present embodiment, the photographic process time for the types A, B and C in the processor section 19 is respectively 180 seconds, 144 seconds, and 450 seconds. The steps for the purpose of changing over between the types A, B and C of the photographic paper 27 are now described. When a first type of the photographic paper preceding a second type of the photographic paper to be used moves out of the fourth rinsing bath 49 at the downstream end of the processor section 19, then new entry of the photographic paper of the first type is stopped at an upstream end of the developing bath 44. Then time is measured, to detect lapse of one of 180 seconds, 144 seconds and 450 seconds associated with the first type among the types A, B and C. Upon this lapse of time, the transporting speed is changed and set at a speed level for the second type. After this, the photographic paper 27 of the second type is transported into the developing bath 44. Accordingly, the time of changing over can be shorter, to raise the efficiency in the printing.

Note that, if the type C is used after the type A, the transporting speed becomes lower than before at a proportion of 2.5. No matter which of the types A and B has been used before the type C, the time of passage through the drier section 20 becomes longer. It is likely that overdrying occurs. To solve this problem, one of various measures is used. For example, the drying temperature may be lowered. The transporting speed may be raised by using a speed raising device between the processor section 19 and the drier section 20. Also, the flow rate of the drying air may be lowered in a range of keeping sufficient air pressure to the conveyor belt 75. Also, there occur changes from the type C to the type A, from the type C to the type B, from the type A to the type B, in which the transporting speed becomes higher than before. It is likely that time of passage through the drier section 20 becomes shorter to cause insufficiency in the drying operation. To solve this problem, one of various measures is used. For example, the drying temperature may be raised. The transporting speed may be lowered by using a speed reducing device between the processor section 19 and the drier section 20. Also, the flow rate of the drying air may be raised.

In the above embodiment, the transporting speed is changed over according to the time of passage of the photographic paper sheet 27c through the baths 44–49. However, a combination of a jam sensor and the reference time can be used as a basis of changing over the transporting speed. The reference time is predetermined as time required for the passage. This modification is effective if it occurs that the photographic paper sheet 27c accidentally remains in one of the baths 44–49 due to a jam or slip even after lapse of the reference time. Note that an example of the jam sensor is a paper sensor 116 or photosensitive material sensor, disposed in the vicinity of the transporting racks or the transporting rollers. Passage of the photographic paper 27 is detected according to a signal of the paper sensor 116. If the passage is not completed even at a lapse of the reference time, then it is detected that jamming has occurred.

A photographic paper sensor to detect existence of the photographic paper 27 also may be a leak sensor disposed in the fourth rinsing bath 49. The leak sensor can detect the leak of the fixing liquid in the rinsing water with very high precision at an order of approximately 1 ppm. It is known that an output signal of the leak sensor changes due to existence and lack of the photographic paper 27. According to changes in the output signal, existence of the photographic paper 27 in the rinsing bath can be detected. It is possible to use a transporting system of transporting in liquid baths, according to which resilient blades are disposed in through openings formed in partitions between the rinsing baths 46–49, in order to block passage of rinsing water in allowing passage of the photographic paper 27. The electrical conductivity of the rinsing water changes according to fine movement of the photographic paper 27 in passage of the blades. It is possible with the leak sensor to detect existence of the photographic paper 27 reliably because of the changes in the conductivity.

Another preferred embodiment of changing the transporting speed of the photographic paper sheet 27c is described now. The photographic paper sheet 27c is tracked in each of the baths 44–49. A tracking signal is generated. In response to this, a change from the existence to the lack of the photographic paper sheet 27c is detected in each of the baths 44–49. Then the transporting speed of the photographic paper sheet 27c can be changed over. An example of the tracking sensor is a photographic paper sensor which is disposed in the vicinity of the transporting racks or the transporting rollers, and which may be a photoelectric sensor. A passage of the photographic paper 27 is detected in response to a signal of a detection signal from the tracking sensor. A sorting signal of the photographic paper 27 generated at the sorting device 26 is also used for tracking in combination with the detection signal.

Figure 7:
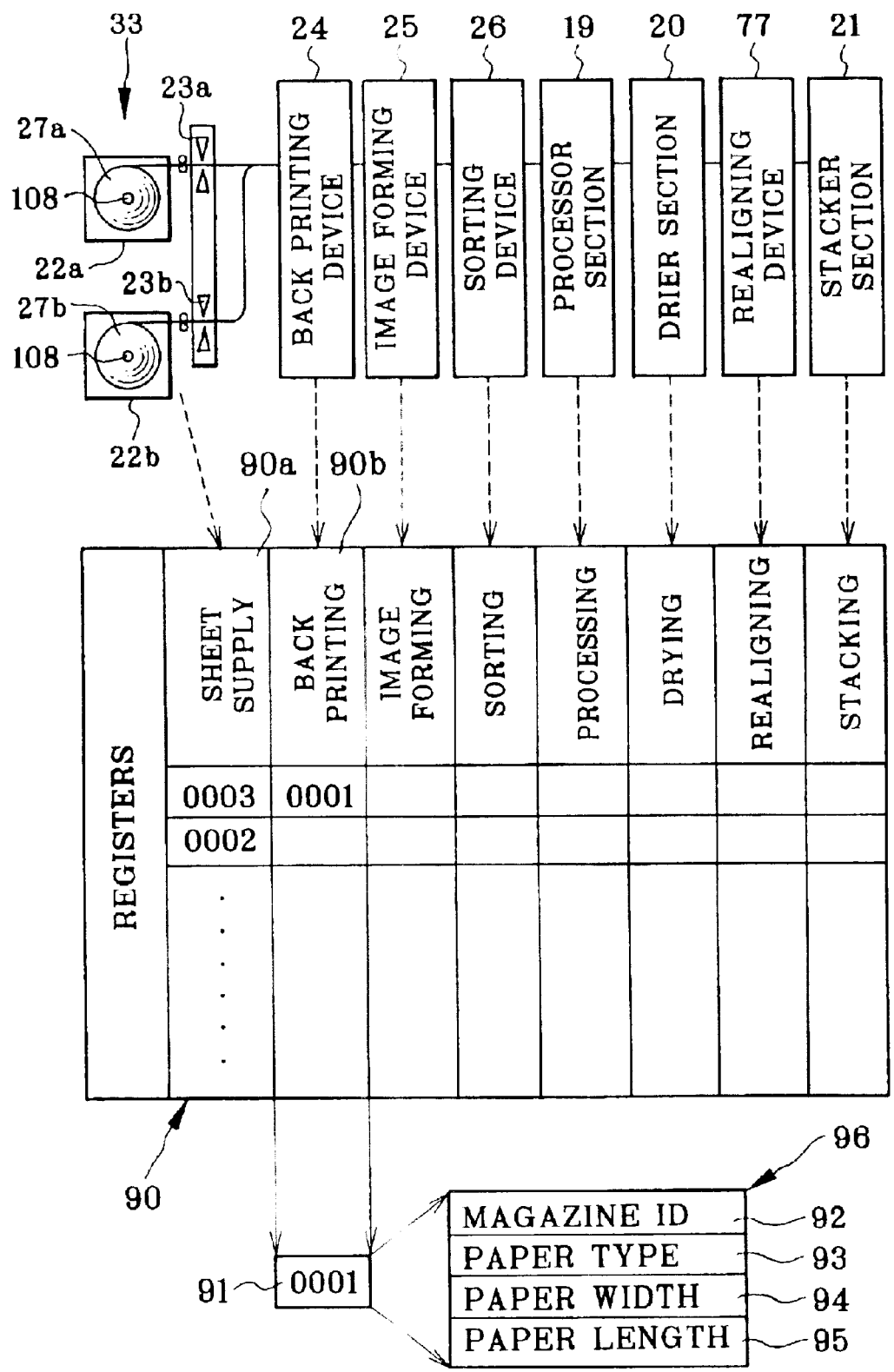
FIG. 7 is an explanatory view illustrating another preferred embodiment in which eight components in the output equipment are associated with registers for storing tracking data.

Also, it is possible to track the photographic paper 27 in all of the output equipment 11 in a range larger than the processor section 19. According to the tracking information, timing of changing the transporting speed of the photographic paper 27 may be determined. As illustrated in FIG. 7, the output equipment 11 is constituted by eight blocks or components, which are a sheet supply section 33, the back printing device 24, the image forming device 25, the sorting device 26, the processor section 19, the drier section 20, the realigning device 77 and the stacker section 21. Note that the sheet supply section 33 in FIG. 1 is constituted by the roll magazines 22a and 22b and the cutters 23a and 23b. At each time that the photographic paper sheet 27c is cut from the photographic paper 27a, 27b in the sheet supply section 33, tracking information, for example a serial number "0001", is generated for the photographic paper sheet 27c.

The tracking information has portions which include tracking ID 91 or serial number, and specific tracking information 96. The specific tracking information 96 includes information of a magazine ID 92, a paper type 93, a paper width 94, and a paper length 95. Registers 90 or memory areas are included in the condition table memory 84 of the controller 60. The tracking information is written to the registers 90. Each one of the registers 90 is associated with one component or block included in the output equipment. When the photographic paper sheet 27c is supplied by cutting in the sheet supply section 33, the tracking information of "0001" is written to one of the registers 90 corresponding to the sheet supply section 33.

When the photographic paper sheet 27c is transported to the back printing device 24 and subjected to back printing, then the initial tracking information "0001" stored in a supply register 90a is shifted to a back printing register 90b. At each time that the components finish their process, tracking information stored in one of the registers is shifted to a register succeeding thereto. In this manner, the tracking ID 91 in combination with the specific tracking information 96 for the photographic paper sheet 27c is shifted sequentially to a succeeding one of the registers 90 corresponding to the components. What is stored in each of the registers 90a, 90b, . . . in the registers 90 is read and checked, to discern easily in which of the components the photographic paper sheet 27c is located. According to the tracking information, the timing of changing the transporting speed of the photographic paper sheet 27c, to raise efficiency in changing the speed in the processor section 19.

In the above embodiments, when unused photographic paper 27 is set after using up or removing the preceding photographic paper, the type of the photographic paper 27 is discerned. According to this, the conditions and operations of the relevant sections are changed or adjusted. Furthermore, the photographic paper 27 of plural types for which the photographic process is different may be loaded in the printer. A desired one of the types of the photographic paper 27 may be selected for printing and processing.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photosensitive material processing apparatus comprising:

a printer section for recording an image on photosensitive material by exposure;

a processor section for photographic development of said photosensitive material being exposed;

a drier section for drying said photosensitive material being developed;

a type discerning unit for discerning type information of a type of said photosensitive material;

a condition information generator for generating information of a processing condition according to said type information being discerned, so as to control at least one of said printer section, said processor section and said drier section; and a transporting mechanism for transporting said photosensitive material in said printer section, said processor section and said drier section serially;

wherein said processing condition includes a transporting speed at which said transporting mechanism transports said photosensitive material;

wherein information of said processing condition is predetermined for each of first and second modes, said first mode being preset with priority of high speed over economized energy, and said second mode being preset with priority of economized energy over high speed; and wherein an externally operable mode selector is configured to selectively determine said first and second modes.

2. A photosensitive material processing apparatus as defined in claim 1, wherein said condition information generator includes a condition table memory for storing information of said processing condition predetermined for each of plural types of said photosensitive material;

one of said plural types is selected according to said type information being discerned.

3. A photosensitive material processing apparatus as defined in claim 2, wherein said processing condition for said printer section includes at least one of existence or lack of back printing to said photosensitive material, an exposing speed to said photosensitive material, a transporting speed of said photosensitive material, and a sorting speed of said photosensitive material to any one of plural transporting paths.

4. A photosensitive material processing apparatus as defined in claim 2, wherein said photosensitive material is a photosensitive sheet;

further comprising:

a roll loading chamber for being loaded with a photosensitive material roll of long photosensitive material; and a cutter for cutting said long photosensitive material unwound from said photosensitive material roll, to obtain said photosensitive sheet, said printer processor being supplied with said photosensitive sheet;

wherein said processing condition includes at least one of a drawing speed of said long photosensitive material from said photosensitive material roll, and a cutting interval adapted to obtaining said photosensitive sheet from said long photosensitive material by cutting.

5. A photosensitive material processing apparatus as defined in claim 2, wherein said processing condition of said processor section includes at least one of a transporting speed of said photosensitive material, liquid temperature of developing liquid for said photosensitive material, and a replenisher flow rate for said developing liquid.

6. A photosensitive material processing apparatus as defined in claim 2, wherein said processing condition of said drier section includes at least one of a transporting speed of said photosensitive material, a drying temperature of drying air for said photosensitive material, and an air flow rate of said drying air.

7. A photosensitive material processing apparatus as defined in claim 2, further comprising a controller for checking whether coincidence occurs between said type information being discerned and said type information of said plural types being stored, and for, if said coincidence does not occur, disabling operation with said photosensitive material, or generating an alarm signal.

8. A photosensitive material processing apparatus as defined in claim 7, wherein said photosensitive material is supplied while contained in a magazine, there is an information region formed in said photosensitive material or said magazine for recording of said type information;

said type discerning unit is an information reader for reading said type information of said photosensitive material from said information region.

9. A photosensitive material processing apparatus as defined in claim 8, wherein said magazine includes a type ID chip, secured to said information region, for storing said type information.

10. A photosensitive material processing apparatus as defined in claim 2, wherein said photosensitive material is supplied in a form of a photosensitive material roll, and said photosensitive material roll includes:

a spool for winding of said photosensitive material in a state with a front end of said photosensitive material positioned outside, and with a back surface of said photosensitive material directed outwards;

a leader sheet, secured to said front end, for being advanced forwards in unwinding said photosensitive material; and an information region, formed in at least one of said front end, said back surface, said leader sheet and said spool, and having said type information of said type of said photosensitive material.

11. A photosensitive material processing apparatus as defined in claim 10, wherein said type information includes a type indicia, a type number, or a type code.

12. A photosensitive material processing apparatus as defined in claim 10, further comprising a type ID chip, secured to said information region, for storing said type information.

13. A photosensitive material processing apparatus as defined in claim 2, further comprising a photosensitive material sensor for checking exiting of a preceding photosensitive material from said processor section;

after exiting of said preceding photosensitive material from said processor section, said transporting mechanism operates at said transporting speed determined newly.

14. A photosensitive material processing apparatus as defined in claim 13, further comprising a controller for detecting whether said photosensitive material has been changed over before reading of said type information in said type discerning unit, and for, if said photosensitive material has been changed over, allowing setting of said transporting mechanism at said transporting speed determined newly.

15. A photosensitive material processing apparatus as defined in claim 14, further comprising a display panel for indicating information related to said type or said transporting speed.

16. A photosensitive material processing apparatus as defined in claim 2, wherein said photosensitive material comprises a photosensitive sheet;

further comprising:

a sheet supply section for supplying said printer section with said photosensitive sheet; and a memory, including:

a first memory area for storing tracking information written thereto in synchronism with operation of said sheet supply section;

a second memory area for storing said tracking information written thereto in synchronism with transport of said photosensitive sheet to said printer section according to shifting from said first memory area;

a third memory area for storing said tracking information written thereto in synchronism with transport of said photosensitive sheet to said processor section according to shifting from said second memory area; and a fourth memory area for storing said tracking information written thereto in synchronism with transport of said photosensitive sheet to said drier section according to shifting from said third memory area, said first to fourth memory areas being adapted to tracking a position of said photosensitive sheet being transported.

17. A photosensitive material processing apparatus as defined in claim 16, wherein said sheet supply section includes:

a roll loading chamber for being loaded with a photosensitive material roll of long photosensitive material; and a cutter for cutting said long photosensitive material unwound from said photosensitive material roll, to obtain said photosensitive sheet.

18. A photosensitive material processing apparatus as defined in claim 16, wherein each of said first to fourth memory areas is constituted by at least one register.

19. A photosensitive material processing apparatus as defined in claim 18, wherein said tracking information represents at least one of said type, a width and a length of said photosensitive sheet;

further comprising a controller for producing said tracking information individually in association with said photosensitive sheet.

20. A photosensitive material processing apparatus comprising:

a printer section for recording an image on photosensitive material by exposure;

a processor section for photographic development of said photosensitive material being exposed;

a photosensitive material sensor for checking exiting of a preceding photosensitive material from said processor section;

a drier section for drying said photosensitive material being developed;

a type discerning unit for discerning type information of a type of said photosensitive material;

a condition information generator for generating information of a processing condition according to said type information being discerned, so as to control at least one of said printer section, said processor section and said drier section; and a transporting mechanism for transporting said photosensitive material in said printer section, said processor section and said drier section serially, wherein said processing condition includes a transporting speed at which said transporting mechanism transports said photosensitive material, and wherein after exiting of said preceding photosensitive material from said processor section, said transporting mechanism operates at said transporting speed determined newly.

21. A photosensitive material processing apparatus as defined in claim 20, wherein said photosensitive material is supplied in a form of a photosensitive material roll, and said photosensitive material roll includes:

a spool for winding of said photosensitive material in a state with a front end of said photosensitive material positioned outside, and with a back surface of said photosensitive material directed outwards;

a leader sheet, secured to said front end, for being advanced forwards in unwinding said photosensitive material; and an information region, formed in at least one of said front end, said back surface, said leader sheet and said spool, and having said type information of said type of said photosensitive material.

22. A photosensitive material processing apparatus as defined in claim 20, wherein said type information includes a type indicia, a type number, or a type code.

23. A photosensitive material processing apparatus as defined in claim 20, further comprising a type ID chip, secured to said information region, for storing said type information.

24. A photosensitive material processing apparatus comprising:

a printer section for recording an image on photosensitive material by exposure;

a processor section for photographic development of said photosensitive material being exposed;

tracking information for checking exiting of a preceding photosensitive material from said processor section;

a drier section for drying said photosensitive material being developed;

a type discerning unit for discerning type information of a type of said photosensitive material;

a condition information generator for generating information of a processing condition according to said type information being discerned, so as to control at least one of said printer section, said processor section and said drier section; and a transporting mechanism for transporting said photosensitive material in said printer section, said processor section and said drier section serially, wherein said processing condition includes a transporting speed at which said transporting mechanism transports said photosensitive material, and wherein after exiting of said preceding photosensitive material from said processor section, said transporting mechanism operates at said transporting speed determined newly.

25. A photosensitive material processing apparatus as defined in claim 24, wherein said photosensitive material is supplied in a form of a photosensitive material roll, and said photosensitive material roll includes:

a spool for winding of said photosensitive material in a state with a front end of said photosensitive material positioned outside, and with a back surface of said photosensitive material directed outwards;

a leader sheet, secured to said front end, for being advanced forwards in unwinding said photosensitive material; and an information region, formed in at least one of said front end, said back surface, said leader sheet and said spool, and having said type information of said type of said photosensitive material.

26. A photosensitive material processing apparatus as defined in claim 24, wherein said type information includes a type indicia, a type number, or a type code.

27. A photosensitive material processing apparatus as defined in claim 24, further comprising a type II) chip, secured to said information region, for storing said type information.

28. A photosensitive material processing apparatus comprising:

a printer section for recording an image on photosensitive material by exposure;

a processor section for photographic development of said photosensitive material being exposed;

a drier section for drying said photosensitive material being developed;

a type discerning unit for discerning type information of a type of said photosensitive material;

a condition information generator for generating information of a processing condition according to said type information being discerned, so as to control at least one of said printer section, said processor section and said drier section; and a transporting mechanism for transporting said photosensitive material in said printer section, said processor section and said drier section serially, wherein said processing condition includes a transporting speed at which said transporting mechanism transports said photosensitive material, wherein said photosensitive material comprises a photosensitive sheet, and further comprising:

a sheet supply section for supplying said printer section with said photosensitive sheet; and a memory, comprising:

a first memory area for storing tracking information written thereto in synchronism with operation of said sheet supply section;

a second memory area for storing said tracking information written thereto in synchronism with transport of said photosensitive sheet to said printer section according to shifting from said first memory area;

a third memory area for storing said tracking information written thereto in synchronism with transport of said photosensitive sheet to said processor section according to shifting from said second memory area; and a fourth memory area for storing said tracking information written thereto in synchronism with transport of said photosensitive sheet to said drier section according to shifting from said third memory area, said first to fourth memory areas being adapted to tracking a position of said photosensitive sheet being transported.

29. A photosensitive material processing apparatus as defined in claim 28, wherein said photosensitive material is supplied in a form of a photosensitive material roll, and said photosensitive material roll includes:

a spool for winding of said photosensitive material in a state with a front end of said photosensitive material positioned outside, and with a back surface of said photosensitive material directed outwards;

a leader sheet, secured to said front end, for being advanced forwards in unwinding said photosensitive material; and an information region, formed in at least one of said front end, said back surface, said leader sheet and said spool, and having said type information of said type of said photosensitive material.

30. A photosensitive material processing apparatus as defined in claim 28, wherein said type information includes a type indicia, a type number, or a type code.

31. A photosensitive material processing apparatus as defined in claim 28, further comprising a type ID chip, secured to said information region, for storing said type information.

* * * * *